May 27, 1952   L. B. BALDWIN   2,598,633
BRAKE AND INCHING CONTROL MECHANISM FOR MECHANICAL PRESSES
Filed April 21, 1948

Inventor
LESLIE BERTRAM BALDWIN
By
Ackenbach & Hirschman
Attorneys

Patented May 27, 1952

2,598,633

UNITED STATES PATENT OFFICE 2,598,633

BRAKE AND INCHING CONTROL MECHANISM FOR MECHANICAL PRESSES

Leslie B. Baldwin, Auburn, near Sydney, New South Wales, Australia, assignor to Welded Products Limited, Alexandria, near Sydney, New South Wales, Australia, a company of New South Wales, Australia Application April 21, 1948, Serial No. 22,358
In Australia July 9, 1947

3 Claims. (Cl. 60—6)

This invention relates to improvements in brake and inching control mechanism for mechanical presses of a known type in which the transmission is by means of a friction plate disc clutch which may be operated by compressed air actuating a piston or pistons; or by toggle, hydraulic, or any other suitable operating means.

An object of the present invention is to provide in a press of the above kind a brake and inching device, which is designed in such a manner that the mechanism, operating to engage the transmission clutch in one direction, operates in the reverse direction to apply a brake.

A further object of the present invention is to provide mechanism adapted to function normally as a brake, and which will also act as an auxiliary clutch, to transmit at reduced speed, intermittent motion, to the press in a normal or reverse direction; by power derived from a small auxiliary electric motor (equipped with forward, reverse, and stop, push button control).

According to the present invention the said brake and inching mechanism consists of a stationary housing enclosing a worm and worm wheel, the worm wheel being in the form of a ring with the inner periphery thereof splined and having at its sides large diameter, narrow journals which have sealing means to enclose the lubricant within the housing. A central disc is slidable in this ring gear and is adapted to be engaged by a pair of discs of which one has a boss and is keyed to the press transmission shaft while the other is slidably mounted on the said boss. A worm engages the said worm wheel and is adapted to either rotate or hold it according to the function required of it, as brake, or inching medium.

When serving as an inching device the worm is driven by an auxiliary motor to which it is directly coupled. Co-acting and in series with this auxiliary motor is a small solenoid operation brake, which prevents the worm being turned by the wheel when acting as a brake. Although the brake and inching mechanism has been described as co-acting with the press transmission clutch unit of known construction, it may be convenient at times to operate the invention as a separate unit either as applied to a press or as a driving and braking medium of any other type of machine.

In order that the invention may be more readily understood, reference will now be made to the accompanying drawings wherein.

Figure 1:
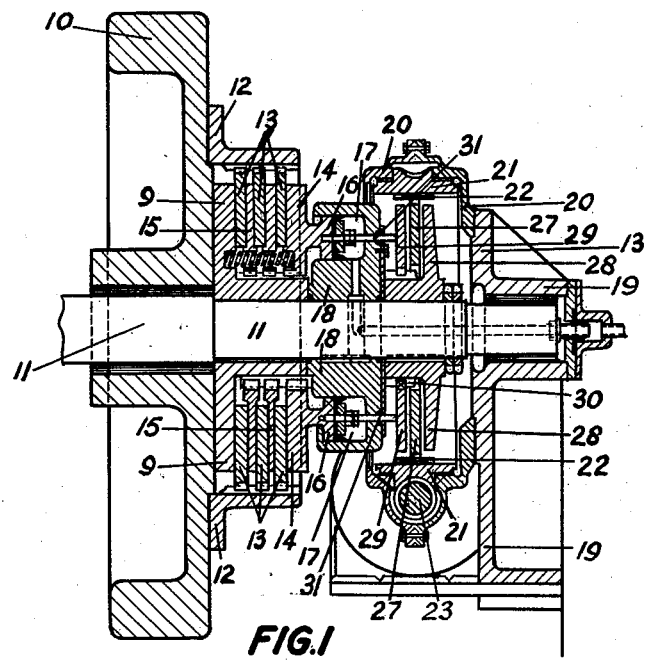
Figure 1 is a longitudinal sectional elevation illustrating the invention.
Figure 2:
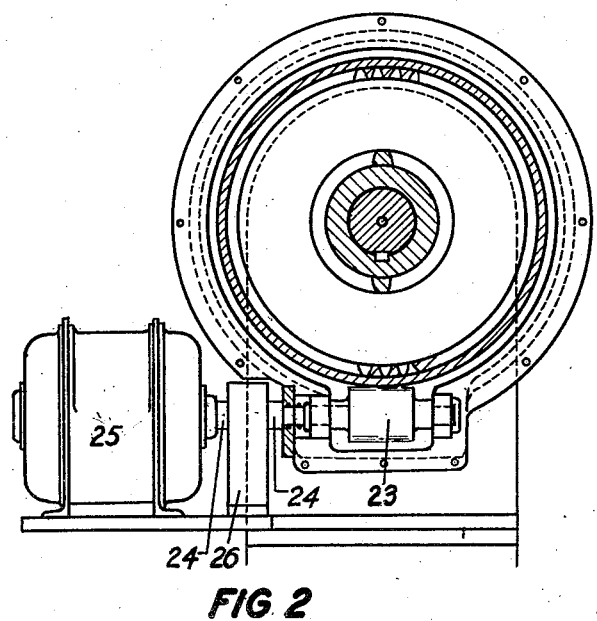
Figure 2 is a part sectional elevation taken through the worm and worm wheel housing and showing the worm wheel in section.

The invention as illustrated, is applied to a press of known construction, only such parts thereof being illustrated as are necessary to enable the invention to be understood.

The parts of the known machine include a flywheel 10, which is mounted upon a shaft 11 and has secured thereto a main clutch housing 12 carrying clutch discs 13 which co-operate with companion clutch members 9 and 14 which latter is secured to shaft 11 and carries clutch plates 15 disposed between said clutch discs 13.

The clutch member 14 has piston members 16 slidable in chambers 17 disposed in a member 18 secured to the said shaft 10 which at its free end is supported in a pedestal bearing 19.

According to the invention, a housing 20 is secured to the pedestal 19 and receives a gear ring or inching control transmission member 21 having internal teeth 22 and adapted to be rotated by a worm 23 disposed within the housing 20 and connected by a shaft 24 to an inching electric motor 25, a solenoid operated brake 26 of known construction, being mounted upon the said shaft 24.

The internal teeth 22 of the gear ring 21 act as splines for a friction disc 27 which co-operates with a friction member 28, keyed to the said shaft 10, and with a friction clutch disc 29 mounted upon teeth 30 formed on the boss portion of the said friction member 28.

Thrust pins 31 are engaged by the clutch disc 29 and extend into chambers 17 in known manner.

Springs 32 separate clutch members 9 and 14 and serve to engage the clutch disc 27, member 28 and friction clutch disc 29. Fluid to operate the clutch 9, 13, 14, 15 is admitted to the respective chambers 17 through the shaft 11 from an external controlled source in known manner.

When an inching operation is required, the motor 25 is operated to rotate the clutch 27, 28, 29 together with shaft 11.

When the press is in operation under power and fluid under pressure is admitted to chambers 17, clutch 9, 12, 13 and 14 comes into operation and the thrust pins 31 move towards the left (Figure 1) and the auxiliary inching clutch 27, 28, 29 is released and runs free.

During inching the brake 26 may be operated to control movement of the shaft 11.

I claim:

1. In apparatus of the class described, a drive shaft adapted to be rotated normally by a principal means; a flywheel rotatably mounted on said drive shaft; a first clutch member mounted on said flywheel; a second clutch member mounted on said drive shaft for axial movement thereon; an inching control transmission member; a spring normally maintaining said second clutch member in engagement with said inching control transmission member; a hydraulic ram for moving said second clutch member away from said inching control transmission member and into engagement with said first clutch member; an auxiliary motor for rotating said inching control transmission member and thereby inching said apparatus by driving said drive shaft when said second clutch member is in engagement with said inching control transmission member; and a solenoidally controlled brake for arresting said auxiliary motor.

2. In apparatus of the class described, a drive shaft; a fly wheel rotatably mounted thereon; a first clutch member mounted on said fly wheel; a second clutch member on said drive shaft for axial movement thereon; an inching control transmission member; a spring normally maintaining said second clutch member in engagement with said inching control transmission member; a hydraulic ram for moving said second clutch member away from said inching control transmission member and into engagement with the said first clutch member; means for locking said inching control transmission member against rotation whereby said inching control transmission member acts as a brake when said second clutch member is in engagement with said inching control transmission member; and means for rotating said inching control transmission member thereby driving the said drive shaft when said second clutch member is in engagement with said inching control transmission member.

3. In apparatus of the class described, a drive shaft, a fly wheel rotatably mounted thereon, a first clutch member mounted on said fly wheel, a second clutch member mounted on said drive shaft for axial movement thereon, an inching control transmission member comprising a third clutch member; an auxiliary motor, a worm connected to said motor for rotation thereby, a wheel in engagement with said worm and engaging said third clutch member, and means provided to lock the worm against rotation whereby said third clutch member may be driven by said motor or locked against rotation by said worm and wheel.

LESLIE B. BALDWIN.

REFERENCES CITED

The following references are of record in the file of this patent:

UNITED STATES PATENTS

| Number | Name | Date |
| --- | --- | --- |
| 226,302 | Galloway et al. | Apr. 6, 1880 |
| 555,036 | Church | Feb. 18, 1896 |
| 1,991,083 | Dean | Feb. 12, 1935 |
| 2,095,094 | Glasner | Oct. 5, 1937 |
| 2,213,111 | Strout | Aug. 27, 1940 |
| 2,252,762 | Feldhausen | Aug. 19, 1941 |
| 2,370,976 | Lear | Mar. 6, 1945 |
| 2,452,775 | Lindsley | Nov. 2, 1948 |